May 14, 1940. L. O. CARLSEN 2,200,412
CUTTER FOR AND METHOD OF CUTTING GEARS
Filed Sept. 4, 1937 2 Sheets-Sheet 1

Inventor
Leonard O. Carlsen
By
Attorney

Patented May 14, 1940

2,200,412

UNITED STATES PATENT OFFICE 2,200,412

CUTTER FOR AND METHOD OF CUTTING GEARS

Leonard O. Carlsen, Rochester, N. Y., assignor to Gleason Works, Rochester, N. Y., a corporation of New York Application September 4, 1937, Serial No. 162,489

12 Claims. (Cl. 90—5)

The present invention relates to the cutting of longitudinally curved tooth gears and particularly to the cutting of longitudinally curved tooth gears of the zero spiral angle type such as may be employed in automobile differentials, airplane drives, etc. This invention is a modification of and improvement upon the invention of my pending application, Serial 130,139, filed March 10, 1937.

One object of the present invention is to provide a method for cutting from the solid in a generating operation each member of a pair of longitudinally curved tooth gears.

Still another object of the invention is to provide a method for generating longitudinally curved tooth gears in which a "single cycle" type of cutter may be employed and in which the two sides of the teeth of either member of a pair of gears may be cut from the solid in a single revolution of the cutter and in such a way as to mesh correctly with the teeth of a mating gear.

A further object of the invention is to provide a new and improved face-mill gear cutter of the "single cycle" type for rough and finish-cutting gears from the solid in a single revolution of the cutter.

A still further object of the invention is to provide a method for cutting gears of the type described in which the burden of cutting is divided approximately equally among the several blades of the cutter.

Other objects of the invention will be apparent hereinafter from the specification and from the recital of the appended claims.

In cutting a gear according to the present invention, a face-mill gear cutter of the "single cycle" type is employed, that is, a cutter which has its cutting blades or teeth arranged part-way around its periphery with a gap between the last and first blades to permit of indexing the blank without relative withdrawal of the cutter from the blank. In the preferred embodiment of the invention, the blades of the cutter are arranged in two groups with a second or "set-over" gap between the two groups of blades. The blades of the first group have cutting edges for cutting opposite sides of a tooth space of the blank while the second group of blades have cutting edges for cutting only one side of a space. The blades of the first group which cut the opposite side of the tooth space from that cut by the blades of the second group have their cutting edges arranged preferably at the same radial distance from the axis of the cutter as the finish-cutting edges of the blades of the second group. Preferably all the blades of the cutter are of the same height.

In operation, the cutter is adjusted into engagement with the gear blank to be cut so that its blades will cut the tooth spaces of the blank to the full depth thereof without relative depthwise feed between the cutter and blank; the cutter is rotated on its axis continuously and as the cutter rotates in engagement wtih the blank, a relative rolling movement is produced between the cutter and blank. During relative roll of the cutter and blank in one direction, a tooth slot is roughed out and one side thereof is finished by the first group of blades of the cutter. Then the set over gap in the cutter comes abreast of the blank and the direction of relative roll of the blank and cutter is reversed causing the blank to be displaced relative to the cutter so that when the second group of blades comes into engagement with the blank, they cut relatively from a different center from that from which the first group of blades has cut. On the return or reverse roll, the second group of blades finish-cuts the other side of the tooth space. Then the index gap in the cutter comes abreast of the blank and the blank is indexed without withdrawing it from engagement with the cutter. Then the roll is again reversed and the operation proceeds as before upon a new tooth space of the blank. Thus, in each revolution of the cutter, a tooth space is completely generated and, when the cutter has made as many revolutions as there are tooth spaces in the blank, the gear will be finished.

Since the tooth space will have been roughed out before the return roll begins and it is only necessary to finish one side of the tooth space during the return roll, it is preferred to effect the return roll at a faster speed than the forward roll. Fewer blades may also be used in the cutter to cut during the return roll. Moreover, since the burden of cutting will be greater when the cutting blades are cutting from the solid than after the tooth space has been roughed out, it is preferred to vary the rate of roll also during the forward roll so that the rolling movement will be accelerated after the full depth of the tooth slot has been cut and the blades are no longer cutting from the solid. The rate of roll, in fact, may be continuously varied throughout the cutting operation so that the chips cut by the different blades may be substantially equal.

A preferred embodiment of the invention has been illustrated in the accompanying drawings, in which.

Figure 1:
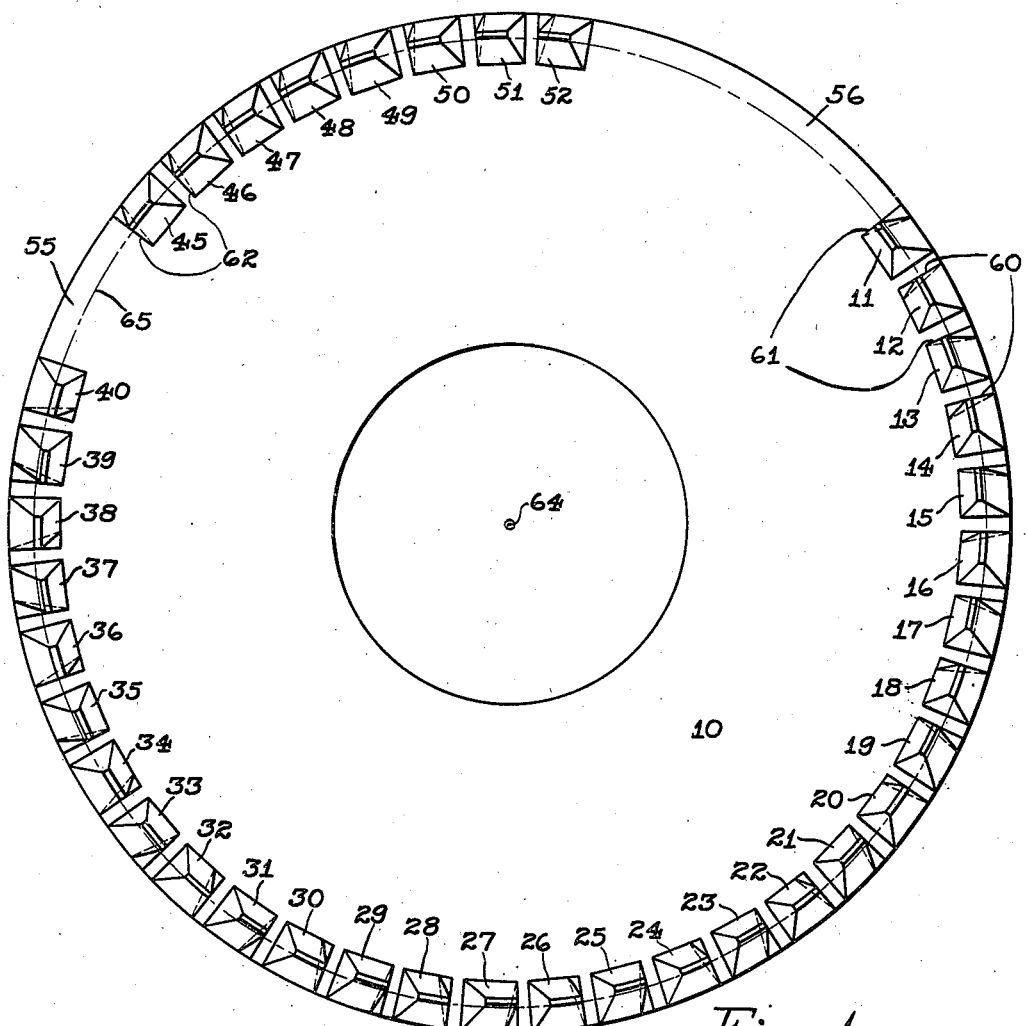
Fig. 1 is a plan view of a preferred form of cutter.

The cutter shown in the drawings comprises a rotary head 10 and a plurality of cutting blades or teeth which are secured to or are integral with the head and which project beyond one side face of the head in the general direction of the axis of the head, as is usual in a face-mill type of gear cutter. The blades are arranged in two groups. The blades of the first group are denoted at 11 to 40 inclusive and the blades of the second group are denoted at 45 to 52 inclusive. There is a peripheral gap denoted at 55 between the last blade 40 of the first group and the first blade 45 of the second group and there is a peripheral gap denoted at 56 between the last blade 52 of the second group and the first blade 11 of the first group. These gaps are provided to permit set over and indexing of the blank, respectively, without withdrawal of the cutter from engagement with the blank, as will be explained more fully hereinafter.

In the embodiment of the invention shown, alternate blades of the first group are sharpened with opposite side rake so that they will cut alternately on opposite sides of tooth space of a gear blank. Thus, the blades 11, 13, etc., are inside cutting blades and cut the convex side of a tooth space while the blades 12, 14, etc., are outside cutting blades and cut the concave side of the tooth space.

In the preferred embodiment of the invention, the cutting edges of all the blades of any series, such as, blades 12, 14, etc., or blades 11, 13, etc., or blades 45, 46, etc., are of the same pressure angle. The pressure angle of the cutting edges 61 of the blades 11, 13, etc., may, however, be the same or different from the pressure angle of the cutting edges 60 of the blades 12, 14, etc., but the pressure angle of the cutting edges 61 of the blades 12, 14, etc., is preferably the same as the pressure angle 62 of the cutting edges of the blades 45 to 52 inclusive.

Further than this, the several blades are preferably so disposed that the outermost points of the cutting edges 60 are at the same radial distance from the axis 64 of the cutter as the outermost points of the cutting edges 62, that is, the outermost points of these two series of cutting edges preferably lie in a circle 65 circumscribed about the axis 64 of the cutter. Thus, the cutter so far as these two series of blades is concerned is of zero point width. It might be made, however, so that other points in the heights of the cutting edges 60 and 62, other than the outermost points of these blades, such as the points which would cut at the pitch surface of a gear, would be at the same radial distance from the axis of the cutter. The inside cutting edges 61 are preferably disposed at a smaller radial distance from the axis of the cutter than are the inside cutting edges 62, that is, the outermost points of the cutting edges 61 will preferably lie in a circle inside of the circle 65.

Figure 2:
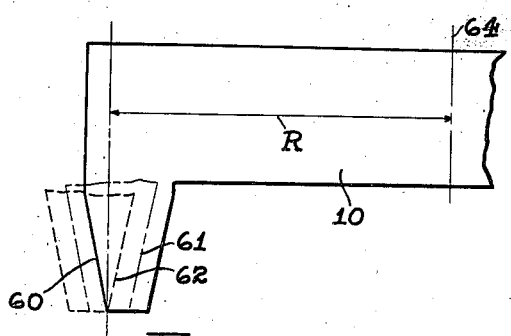
Fig. 2 is a diagrammatic view illustrating the relative radial positions of different blades of this cutter.

The preferred arrangement of the cutting edges is illustrated clearly in Fig. 2. Here one of the outside cutting blades 12, 14, etc., is shown in full lines and superimposed upon it, to show the relative radial positions of these blades, are one of the inside cutting blades 11, 13, etc., of the first group of blades whose cutting edge is denoted at 61 and one of the inside blades of the second group of blades 45 to 52 inclusive, whose cutting edge is denoted at 62. It will be noted that the cutting edges 60 and 62 intersect at their outermost points and that these points are at the same radial distance R from the axis 64 of the cutter, whereas the inside cutting edge 61, is disposed parallel to the inside cutting edge 62 but is arranged radially inwardly of the edge 62.

The operation of the cutter in the cutting of gears according to the preferred method of the present invention is illustrated diagrammatically in Figs. 3 to 8 inclusive. G denotes the gear blank to be cut, which may be a spur, a bevel or a hypoid gear blank. The lines 70 and 71 denote opposite sides of a tooth space which is to be cut in the blank.

The cutter is so arranged relative to the blank that it will cut the tooth spaces of the blank to the full depth thereof without relative feed. Thus, as shown, the cutter is so arranged relative to the blank that the plane 72 of the tips of its blades is tangent to the root surface 73 of the blank. In the cutting of the blank, the cutter is rotated continuously on its axis 64 preferably at a uniform velocity. Each tooth space of the blank is cut by effecting a relative rolling motion between the cutter and the blank while the cutter rotates in engagement with the blank. This rolling motion may be of any suitable nature. In the drawings, it is illustrated as comprising rotation of the work and translation of the cutter.

Figure 3:
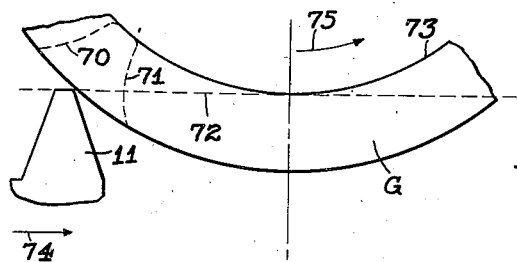
Figs. 3 to 8 inclusive are diagrammatic views, illustrating successive positions of the cutter and a gear blank in the generation of a tooth space of the blank.
Figure 4:
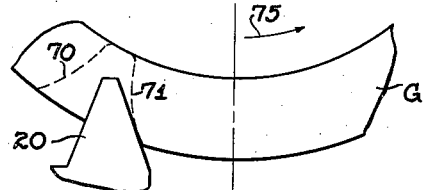

Fig. 3 shows the beginning of the cutting operation. The first blade 11 of the cutter is just about to take its cut into the solid blank. 70 and 71 denote the sides of the tooth space to be cut. The cutter is rotating on its axis and is simultaneously being translated in the direction of the arrow 74 while the work is rotating in the direction of the arrow 75. As the roll proceeds, successive blades of the cutter take, respectively, cuts on opposite sides, deeper and deeper into the blank, widening out and deepening the tooth space being cut. Fig. 4 shows the position of blank and cutter in the roll when the blade 20 is taking its cut and at this point, the space cut in the blank is that which lies between the sides of this blade. At this point, the cutter begins to form the finished side 71 of the tooth space.

Figure 5:
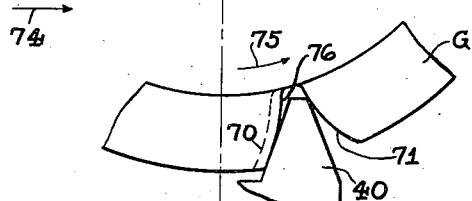
Figure 6:
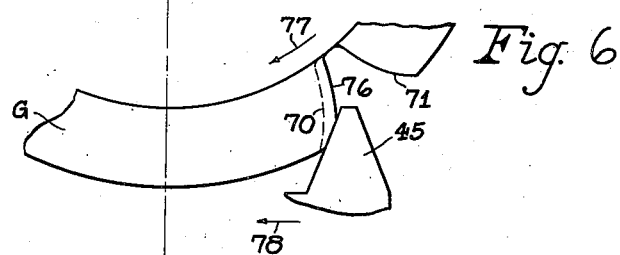

In the continued roll of the blank, the blank will reach the position denoted in Fig. 5 where the final blade 40 of the first group of blades is taking its cut and where the side 71 of the tooth space will have been completely generated and a slot bounded by the sides 71 and 76 will have been cut. At this stage in the operation, the gap 55 in the cutter will come abreast of the blank and the direction of relative roll is reversed. At the same time, the blank is displaced angularly relative to the cutter. Hence, when the blade 45 comes into cutting position (Fig. 6), it will be cutting, relative to the blank, at a different center from the blades 11 to 40 inclusive. Then it and the blades which follow it will remove additional stock from one side of the tooth space, cutting away the metal between the lines 76 and 70 to produce the final finished tooth side 70. The arrows 77 and 78 indicate the direction of the return roll.

Figure 7:
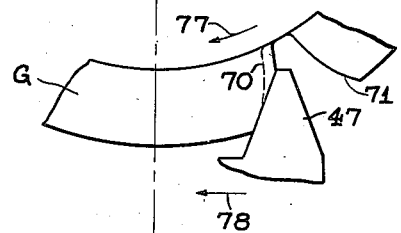
Figure 8:
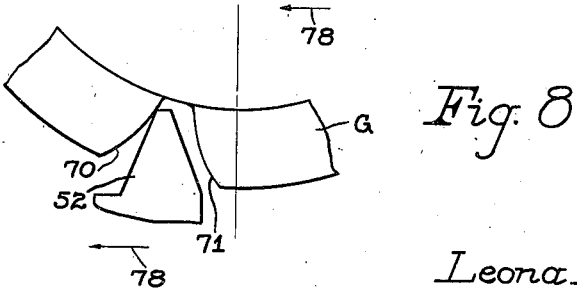

Fig. 7 illustrates a further position in the return roll, namely, that at which the blade 47 of the cutter is in action. Successive blades 48, 49, etc., take further cuts along the left hand side of the tooth slot, removing the stock from between the lines 76 and 70 and generating the finished tooth profile 70 so that when the blank has rolled to the position shown in Fig. 8 and the blade 52 is taking its cut, the profile 70 will have been completed.

In the further return roll, the indexing gap 56 of the cutter will be abreast of the blank and when cutter and blank have returned to a position corresponding to that shown in Fig. 3, the indexing of the blank will have been completed so that when the direction of roll is again reversed and the cutter and blank again roll in the direction of the arrows 74 and 75, the blades of the cutter will cut in a new tooth space of the blank.

It will be noted that the number of blades 45 to 52 inclusive, which cut during the return roll, are considerably less than the number of blades 11 to 40 inclusive, which cut in the forward roll. This is because the principal amount of stock has been removed from the tooth space during the forward roll and fewer blades 45 to 52 inclusive are required to remove, during the return roll, the relatively small amount of stock left between the lines 76 and 70. The return roll can be effected at a much more rapid rate than the forward roll and thus the burden of cutting will more nearly equally be distributed, for the blades 45 to 52 inclusive will, then, cut chips approximately equal to those cut by the blades 11 to 40 inclusive in the forward roll. The variation in rate of roll may, with advantage, be employed also on the forward roll for, when the first blades of the cutter are cutting, they will cut on both sides and in the bottom of the tooth slot, as seen in Fig. 4, but during the latter part of the roll, as will be clear from Fig. 5, after the slot has been more or less roughed out, the cuts will be taken largely by one side of the blades and therefore the roll can be accelerated so that these latter blades will take chips approximately of equal size to those taken by the first blades of the cutter. The variation in rate of roll can be accomplished in the gear cutting machine by known means.

For gears of larger diameter than that shown, it is not necessary to take cuts on both sides of the tooth slot throughout the whole of the forward roll, since the tooth slot will be roughed out early in the roll. Therefore, instead of making all the blades of the first group cut alternately on opposite sides of the tooth space, the last few blades of this group may be made to cut on one side of the tooth space only, namely, the side which is finished in the forward roll.

In the illustrated embodiment of the invention, the amount of stock to be removed during the return roll is determined by the amount of set over of the blank when the gap 55 is abreast of the blank. In some cases, particularly for gears of coarse pitch, the thickness of metal to be cut away on the return roll may be more than it is desirable that any blade cut. In this event, the first few blades 45, 46, etc., which follow the setover gap may be offset radially of the axis of the cutter with reference to one another and with reference to subsequent blades so that they will cut at different radial distances and slice off part of this stock to leave a thickness of metal which can be removed practically by the remaining blades during the rest of the return roll. These offset blades constitute, then, in effect further roughing blades.

While I have shown a cutter in which the opposite side cutting edges of the first group of blades are provided on alternate blades, it will be understood that each blade might, if desired, be sharpened to cut on both sides of the tooth space simultaneously. Other modifications of the invention will readily occur to those skilled in the art.

With the present invention, it is contemplated to generate both members of a gear pair as described. With the arrangement of cutting blades described, the two sides of a tooth slot will be of equal radii of curvature at the bottom of the tooth slot because the opposite side cutting blades 12, 14, etc., and 45, 46, etc., are of equal radii at their outermost points. By generating both members of a pair with a cutter such as shown, the two members will mesh correctly together because opposite sides of the teeth of each member of the pair will have the same radii of curvature. Where the radii of curvature of opposite side cutting edges of the blades are equal at the tips of the blades, as shown, the radii of opposite sides of the tooth spaces will differ somewhat at the pitch line and this will give a desirable localization of tooth bearing. Instead of making the opposite side cutting edges of equal radii at their tips, however, they may be made of equal radii at any other point along their height.

In general it may be said that while the invention has been described in connection with a particular embodiment thereof, it is capable of various further modifications and uses and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter for cutting gears in a generating operation by continuous rotation of the cutter and intermittent indexing of the blank, comprising a rotary head and a plurality of cutting blades which project beyond one side face of the head in the general direction of the axis of the head, said blades being arranged in two groups with a gap between the last blade of one group and the first blade of the other group, said gap being provided to permit of indexing the blank without relative withdrawal of the cutter from the blank, the blades of one group being sharpened to have cutting edges for cutting opposite sides of a tooth space and the blades of the second group being sharpened to have cutting edges for cutting only one side of a tooth space.

2. A face-mill gear cutter for cutting gears in a generating operation by continuous rotation of the cutter and intermittent indexing of the blank, comprising a rotary head and a plurality of cutting blades which are arranged in two groups part-way around the periphery of the cutter with a gap between the last blade of one group and the first blade of the other, the blades of the first group having cutting edges for cutting opposite sides of a tooth space of a gear blank and the blades of the second group having cutting edges for cutting one side only of a tooth space, the cutting edges of the first group, which cut the opposite side of the tooth space from that cut by the cutting edges of the second group, being disposed radially of the axis of the cutter measured in a given plane perpendicular to the axis of the cutter at the same distance as the cutting edges of the second group, and the gap between the last blade of the second group and the first blade of the first group being of sufficient angular extent to permit indexing the blank when the cutter is abreast of the blank without relative withdrawal of the cutter from the blank.

3. A face-mill gear cutter for cutting gears in a generating operation by continuous rotation of the cutter and intermittent indexing of the blank, comprising a rotary head and a plurality of cutting blades which are arranged in two groups part-way around the periphery of the cutter with a gap between the last blade of one group and the first blade of the other, the blades of the first group having cutting edges for cutting opposite sides of a tooth space of a gear blank and the blades of the second group having cutting edges for cutting one side only of a tooth space of the blank, the cutting edge of the first group which cut on the same side of the tooth space as the cutting edges of the second group being arranged radially of the axis of the cutter measured in a given plane perpendicular to the axis of the cutter at a different distance from the cutting edges of the second group, and the gap between the last blade of the second group and the first blade of the first group being of sufficient angular extent to permit indexing of the blank when the cutter is abreast of the blank without relative withdrawal of the cutter from the blank.

4. A face-mill gear cutter for cutting gears in a generating operation by continuous rotation of the cutter and intermittent indexing of the blank, comprising a rotary head and a plurality of cutting blades which are arranged in two groups part-way around the periphery of the cutter with a gap between the last blade of one group and the first blade of the other, the blades of the first group having cutting edges for cutting opposite sides of a tooth space of the blank and the blades of the second group having cutting edges for cutting one side only of a tooth space, the cutting edges of the first group, which cut the opposite side of the tooth space from that cut by the cutting edges of the second group, being disposed radially of the axis of the cutter measured in a given plane perpendicular to the axis of the cutter at the same distance as the cutting edges of the second group, and the cutting edges of the first group which cut on the same side of a tooth space as the cutting edges of the second group being arranged radially of the axis of the cutter measured in said plane at a distance different from that of the cutting edges of the second group, and the gap between the last blade of the second group and the first blade of the first group being of sufficient angular extent to permit indexing the blank when the cutter is abreast of the blank without relative withdrawal of the cutter from the blank.

5. The method of cutting a gear which comprises roughing out a tooth slot and finishing one side of the tooth slot during relative roll of the cutter and blank in one direction, displacing the blank relative to the tool at the end of the roll in said direction, and finishing the opposite side of the tooth slot during relative roll of the cutter and blank in the opposite direction.

6. The method of cutting a gear which comprises employing a tool having a plurality of cutting edges arranged part-way around its periphery with a gap between the last and first blades, rotating said tool in engagement with a gear blank while producing a relative rolling movement between the tool and blank first in one direction and then in the other, moving the blank relative to the tool at the end of the roll in one direction so that the tool will cut from a different center on the return roll, and indexing the blank when the gap in the tool is abreast of the blank.

7. The method of cutting a gear which comprises employing a cutter having a plurality of cutting blades arranged in two groups part-way around its periphery with a gap between the last blade of one group and the first blade of the other, there being blades in the first group for cutting one side of a tooth space of a blank and blades in the second group for cutting the opposite side of a tooth space, rotating said cutter in engagement with a gear blank while producing a relative rolling motion between the cutter and blank first in one direction and then in the other, and adjusting the cutter and blank relative to one another at the end of the roll in one direction and between the action of the two groups of blades so that the blades of the second group cut relatively from a different center during the return roll.

8. The method of cutting a gear which comprises employing a face-mill gear cutter that has a plurality of cutting blades arranged in two groups part-way around its periphery with a gap between the last blade of one group and the first blade of the other, there being blades in the first group for cutting one side of a tooth space which have cutting edges at the same radial distance from the axis of the cutter measured in a given plane perpendicular to the axis of the cutter as the cutting edges of blades in the second group which cut the opposite side of the tooth spacer, rotating said cutter in engagement with a gear blank while producing a relative rolling movement between the cutter and blank first in one direction and then in the other, and adjusting the cutter and blank relative to one another at the end of the roll in one direction and between the action of the two groups of blades so that the blades of the second group cut relatively from a different center during the return roll.

9. A face-mill gear cutter for cutting gears in a generating operation by continuous rotation of the cutter and intermittent indexing of the blank comprising a rotary head and a plurality of cutting blades which project beyond one side face of the head in the general direction of the axis of the head and are arranged in two groups part-way around the periphery of the head with a gap between the last blade of one group and the first blade of the other group, certain blades of the first group being adapted to cut one side of a tooth space of a gear blank and certain blades of the second group being adapted to cut the opposite side of the tooth space, the described blades of the two groups having their opposite cutting edges at the same radial distance from the axis of the cutter measured in a given plane perpendicularly to the axis of the cutter.

10. The method of cutting a gear which comprises employing a face-mill gear cutter that has a plurality of blades arranged in two groups part-way around its periphery with a gap between the last blade of each group and the first blade of the other, the first group of said blades having cutting edges for cutting opposite sides of a tooth space and the second group of blades having cutting edges for cutting one side of the tooth space only, rotating the cutter in engagement with a gear blank while producing a relative rolling movement between the cutter and blank, and reversing the direction of roll and adjusting the cutter relative to the blank when the first gap in the cutter is abreast of the blank so that the cutter will cut relatively from a different center on the return roll, and indexing the blank when the second gap in the cutter is abreast of the blank, and varying the rate of roll during the roll so as to distribute the burden of cutting approximately equally over the different blades of the cutter.

11. The method of cutting a gear which comprises employing a face-mill gear cutter that has a plurality of blades arranged in two groups part-way around its periphery, one group having cutting edges to cut one side of a tooth space and the other group having cutting edges to cut the opposite side of a tooth space, and rotating said cutter in engagement with a gear blank while producing a relative rolling movement between the cutter and blank, and shifting the cutter relative to the blank between the operation of the two groups of blades so that opposite sides of a tooth space of the blank are cut relatively from different centers, and indexing the blank when the gap in the cutter is abreast of the blank.

12. The method of cutting a gear which comprises employing a face-mill gear cutter which has a plurality of cutting blades arranged in two groups part-way around its periphery with a gap between the last blade of one group and the first blade of the other, the blades of one group having cutting edges for cutting opposite sides of a tooth space and the blades of the other group having cutting edges for cutting one side only of a tooth space, adjusting the cutter into engagement with a gear blank so that the cutter will cut to the full depth of the tooth spaces of the blank without relative depthwise feed movement between cutter and blank, rotating the cutter in engagement with the blank, and producing a relative rolling movement between the cutter and blank in one direction while the first group of blades are taking their cuts, displacing the blank relative to the cutter, when the first gap in the cutter is abreast of the blank, then producing a relative rolling movement between the cutter and blank, in the opposite direction while the second group of blades are taking their cuts, and indexing the blank when the second gap in the cutter is abreast of the blank.

LEONARD O. CARLSEN.